United States Patent Office 3,281,216
Patented Oct. 25, 1966

3,281,216
METHOD OF PRODUCING AMORPHOUS SALT-FREE SILICA POWDER CAPABLE OF FORMING A SOL IN AQUEOUS LOWER ALKYL AMINE SOLUTIONS
Morris Mindick, Chicago, Harold I. Patzelt, Oak Lawn, and Lewis E. Reven, La Grange Park, Ill., assignors to Nalco Chemical Company, Chicago, Ill., a corporation of Delaware
No Drawing. Filed Nov. 3, 1961, Ser. No. 149,884
4 Claims. (Cl. 23—299)

This invention is directed to amorphous salt-free silica powders and process for making them. With more particularity, the invention relates to solid amorphous salt-free silica having at least one dimension of 0.5–50 microns, which is capable of forming a sol in aqueous lower alkyl amine solutions.

Silica-containing materials have long been known in the art and have advantageously been used to impart slip resistance to textile fibers and floor paints, as a filler in rubber, as a pigment in paints, etc. Efforts to supply silica for such uses by grinding glass, quartz, or sand, have been relatively unsuccessful due to the resultant unsuitably large particle size. Therefore, in order to perform the above listed tasks, it is preferable to employ silica in the form of submicroscopic particles. These particles are ordinarily dispersed in aqueous and/or organic media in order to form true sols, and are usually supplied in this diluted form. However, the use of aqueous or organo-silica sols, or mixtures thereof, has certain drawbacks, especially wtih regard to handling costs and shipping and storing expenses. This, of course, is due to the large amount of inactive vehicle necessarily present even in relatively concentrated silica sols, that is, sols containing up to 60.0% $SiO_2$ by weight.

In view of price disadvantages in providing silica in the form of a sol, efforts have been directed toward providing a silica product in the form of a power which may be used directly or may be compounded into a sol just prior to its ultimate use. For example, U.S. Patent 2,601,-352 points out a method for making aqueous sols from a solid composition comprising sub-microscopic silica intimately mixed with organic nitrogen bases. However, in this case, the solid silica composition contains from about 6% to 50% of organic nitrogen base, based on the weight of silica. Such a product is undesirable, when a pure silica particle is desired. The nitrogen compositions tend in some manner to be intimately tied up with the silica, which may make subsequent modification of the silica particle extremely difficult or in some instances impossible.

It would therefore be an advantage to the art to supply solid silica particles which contain little or no organic contamination, and could be shipped and stored with a minimum of handling expense. It would be a special advantage if a method could be devised for producing high purity solid, salt-free silica particles which may be quickly and efficiently redispersed in some common solvent to form a sol just prior to their particular industrial or household use. These silica powders in many instance could even be used without resort to a separate solvent system if the particular media into which they were to be incorporated were compatible with the silica powder. It would also be an important advantage to be able to produce these solid silica particles by using conventional rapid-drying equipment without causing the powder to become cross-linked to such an extent that it cannot later be redispersed to form a usable sol. A special advantage would be realized if the powders could be produced so as to be substantially free from electrolytic salts which may be undesirable process interfering agents in many cases.

Therefore, it becomes an object of the invention to provide novel easily dispersible silica particles and the methods of making same.

Another object is to provide amorphous, solid silica particles which additionally are salt-free and can be easily produced from conventional salt-free aqueous or organo-silica sols.

Still another object is to provide salt-free silica particles which are capable of forming a sol in aqueous lower alkyl amine solutions. Yet another object is to provide a method of producing amorphous salt-free silica powders by utilizing conventional rapid evaporating means.

Yet another object is to spray-dry aqueous salt-free silica sols which have contained therein a small amount of volatile amine so that the entire process is carried out under relatively corrosion-free conditions.

Other objects will appear hereinafter.

In accordance with the invention, it has been discovered that amorphous salt-free silica particles which are capable of forming a sol in aqueous lower alkyl amine solutions may be produced by subjecting a salt-free silica sol to rapid evaporation means in order to drive the liquid carrier from the solid silica contained therein by conventional rapid volatilization methods. It is essential to the redispersion process that the starting silica sols by salt-free, that is to say, essentially free of any electrolyte. These starting sols, which will be described in fuller detail below, contain discrete, dense, sub-microscopic silica particles 5–150 millimicrons in diameter as a dispersed phase which is uniformly dispersed in a liquid continuous phase. This liquid continuous phase may be water or any suitable volatile organic media.

The amorphous salt-free silica particles may all be characterized by having certain essential properties. These powders have at least one linear dimension ranging in size from .5 to 50 microns. They are also aptly described as particles which are non-spheroidal in character. This is to say, they are irregular shaped or angular in dimensional character. Further, these powders are porous, extremely friable, and can be easily sheared by any suitable mechanical method. Generally, however, the minimum size to which these powders can be reduced is about 0.5 micron.

While the exact chemical nature of these powders is not fully known, it is believed that they are some type of agglomerates of the silica particles existing in sol form prior to the rapid evaporation process, characterized by little or no siloxane bonding of the powdery products. This is evident since the powders, while of a considerably larger size than the precursor silica particles existing as the dispersed phase of the sol, are nevertheless easily dispersed in lower alkyl amine solutions to form a true sol again. In view of this, it is believed that only some type of physical bonding or perhaps weak hydrogen bonding, holds the discrete ultimate silica particles in contact with one another to form the amorphous powder. Again, as has been mentioned above, this powder is easily reduced in size, which again shows the weak bonding character of the ultimate silica particles in the weak network composing the over-all porous powder. The silica powders then are, in reality, loosely bound aggregates of discrete ultimate silica particles which go to make up the original starting sols. Outside of the difference in size, the dry solid amorphous silica powders have essentially the same character, both as to physical and chemical properties, as do the ultimate silica particles of the sol provided and used in making the powder itself.

Probably the most important property of the silica powders of the invention, is their substantially complete freedom from electrolyte. More particularly, they are essentially free of any alkali metal or alkaline earth ions.

The preferred products have an alkali ion content, expressed as $Na_2SO_4$, of less than 0.01%. Since most common sols are stabilized through the use of sodium hydroxide, a more common way of expressing alkaline ion content is in terms of sodium ions present. Using this criteria, the powders of the invention also have a sodium content, expressed as $Na_2SO_4$, of less than 0.01%. Many of the most preferred amorphous powders have even a lower sodium content than expressed above.

Another way of characterizing the amorphous silica powders of the instant invention is in terms of their hydrogen ion content. If a 5% aqueous solution of the particles is prepared, it has been noted that the pH of this slurry of preferred amorphous powders is below 5.0. The most preferred powders exhibit a pH in the range of from 2 to 4 when made up in a 5% aqueous slurry. The acid nature of these particles is probably due to the fact that little or no hydroxide or alkali ions are occluded in or are in intimate contact with the silanol groups of the silica particles. Rather, as has been described above, the amorphous powders of the invention are substantially free of any electrolyte, such as alkaline ionic materials.

It is interesting to note at this point that if conventional silica sols are employed in the invention, that is, those sols normally stabilized with a relatively large amount of sodium hydroxide or other alkaline hydroxide material, these sols when rapidly evaporated to powders are unable to be redispersed to any appreciable extent, nor are they capable of forming a sol with an aqueous amine solution. As will be pointed out in more detail below, it is essential, then, that the amorphous powders be substantially free of any electrolyte in order that they may be made available for further use as a dispersion or sol.

THE STARTING SILICA SOLS

As has been mentioned above, the particular desirable silica sols used in forming the amorphous powders of the invention are those sols which are known generally as salt-free silica sols. The continuous liquid phase may be either organic or aqueous in nature. However, the preferred materials are those sols which have water as a continuous phase and as a dispersed phase, silica particles which are dense and discrete in nature, and have an average particle diameter which does not exceed 150 millimicrons. Preferably, the silica particles are from 5 to 150 millimicrons in diameter and most preferably from 5 to 70 millimicrons in diameter.

Aqueous colloidal silica sols may be conveniently prepared by utilizing the teachings of Bird, U.S. Patent 2,244,325. This patent teaches the treatment of dilute alkali metal silicate solutions with cation exchange resins in the hydrogen form to remove substantially all the alkali metal from the silicate. The products produced by the Bird ion exchange method are most frequently dilute, e.g., 1–4% by weight solutions of colloidal silica. Since silica sols of this type are too dilute to be economically utilized in the processes of the invention, it is expedient that they be concentrated to a point whereby the silica concentration is between about 5% and 60% by weight silica expressed as $SiO_2$. Several methods have been described for conveniently concentrating silica sols of the type produced by Bird, U.S. Patent 2,244,325. In particular, reference may be made to U.S. Patents 2,574,902, 2,601,235, 2,680,721 and 2,929,790. By using the teachings of these patents, which effectively employ a constant volume evaporation technique, it is possible to produce aqueous colloidal silica sols which have silica concentrations ranging between 20% and 40% by weight. These concentrations are desirable for use in the practices of this invention.

While sols of the above types may be rapidly evaporated to amorphous silica powders, the products are generally not suitable, since they are completely inert to any solvent system and cannot be redispersed in common liquids. Therefore, it is an important concept of the invention that such aqueous silica sols be further treated, before the drying steps used to obtain the finally desired solid, amorphous, salt-free silica particles which may be redispersed to form a sol in lower alkyl amine aqueous solutions.

When producing aqueous silica sols of the type above described, for instance, in Bechtold et al., U.S. Patent 2,574,902, it is necessary to stabilize the sols by adjusting the silica to alkali metal ratio, expressed as $SiO_2:Na_2O$, so that it is at most 130:1 and preferably in the range from 70:1 to 100:1. As just mentioned, alkali metal containing sols are not suitable for further processing to form solid products. To produce suitable amorphous silica powders redispersible in lower alkyl amine aqueous solutions, it is therefore necessary that these alakline cations be removed from the surface of the colloidally dispersed silica particles. This may be readily accomplished by treating typical silica sols of the type described in Bechtold et al., U.S. 2,574,902, with a cation exchange resin the hydrogen form and a strong base anion exchange resin in the hydroxide form. This treatment tends to produce a finished silica sol which we prefer to call "salt free." The particles of silica in such a sol are also considered as being "salt free."

Typical commercially available silica sols which may be deionized as described above to give starting materials that may be modified are those silica sols which are sold by the Nalco Chemical Company under the tradename of "Nalcoag." The physical and chemical properties of these types of silica sols, prior to deionization, are set forth below in Table I.

TABLE I

|  | Sol I | Sol II | Sol III |
|---|---|---|---|
| Percent colloidal silica as $SiO^2$ | 30 | 35–36 | 49–50 |
| pH | 10.2 | 8.6 | 9.0±0.1 |
| Viscosity at 77° F. cps | <5 | <5 | 20–30 |
| Specific gravity at 68° F | 1.205 | 1.255 | 1.385 |
| Average surface area $M^2$ per gram of $SiO_2$ | 190–270 | 135–190 | 120–150 |
| Average particle size millimicrons | 11–16 | 16–22 | 20–25 |
| Density #/gallon at 68° F | 10.0 | 10.5 | 11.6 |
| Freezing point, °F | 32 | 32 | 32 |
| $Na_2O$, percent | 0.40 | 0.10 | 0.30 |

To illustrate the deionization of the above type sols, the following is presented by way of example.

Example I

A silica sol corresponding to Sol No. II was decationized by passing the sol through a column of cation resin in the hydrogen form. The resin was Nalcite HCR which is described in U.S. Patent 2,366,007. Following this treatment, the silica sol was passed through a strong base anion exchange resin in the hydroxide form. In this instance, the resin was a commercially available product known as Nalcite SBR which is described in U.S. Patent 2,591,573.

Sols deionized in accordance with the above technique will have a pH within a range of 2.7 to 4.0, a specific conductivity of between 100 and 500 micromhos/cm. and when the silica concentration is between 5 and 50% by weight, their viscosities will range between 1 and 20 c.p.s.

An important advantage derived by the use of a strong base anion exchanger in the hydrogen form in the deionization procedure described above is that the finished products are substantially free of $CO_2$ and low molecular weight forms of silicic acid. These deionized sols are stable, thereby allowing them to be prepared and stored well in advance of the subsequent processes to which they are subjected in the steps of the invention. They have a salt content expressed as $Na_2SO_4$, of less than 0.01%.

When the particle sizes of the silica sols are within the ranges specified the silica particles present in the starting aqueous sols will have surface areas of at least 20 $m.^2/g.$ with the surface areas being usually in excess of 120 m.²/g.

Other preferred aqueous salt-free sols are those produced as disclosed in our copending application Serial No. 103,425 filed April 17, 1961, and entitled "Method of Stabilizing Silica Sols." There described, is a method of producing extremely valuable deionized silica sols having a silica content of from 3 to 50% by first contacting the sols with an ion exchange resin system composed of at least a hydrogen form strong acid cation exchange resin, allowing the treated sols to age for at least one hour and then contacting the sols again with a hydrogen form strong acid cation exchange resin and a hydroxide form strong base anion exchange resin. The aqueous silica sols produced by this method, commonly known as a double deionization method, are all stable under acid conditions and are particularly suitable in forming the amorphous powders of the invention. The contents of the above copending application are herein incorporated by reference.

Non-aqueous silica sols generally known as organosols may also be used. Again, it is essential that these silica sols be also salt-free. In Iler, U.S. 2,801,184, is shown a method of producing finely divided colloidal silicas dispersed in organic liquids. The salt-free organo silica sols of this reference may be used as starting sols of the instant invention. However, the Iler method is somewhat disadvantageous, since only dilute sols can be worked with, and several reaction stages are necessary before the end products are produced. The most preferred organo sols from the standpoint of ease of preparation and substantial silica concentration are those salt-free organo sols described in commonly assigned copending application Serial No. 821,474, filed January 9, 1961, now U.S. Patent No. 2,966,065, entitled "Non-Aqueous Silica Sols and Method for Preparing Same." These non-aqueous, salt-free silica sols have a water-miscible, monohydric alcohol, preferably "Cellosolve" alcohols, as their continuous phase. The final products contain esterified silica particles, but if the reaction is stopped before the esterification reaction and removal of final traces of water takes place, stable organosols may be produced in which the silica particles are substantially non-esterified. These organosols are stabilized and produced in the presence of a hydrogen bonding agtnt which also acts as a stabilizer during the method of producing same. The disclosure of this latter application is also incorporated herein by reference. While the above type of salt-free organosols is preferred, any salt-free organosol may be used as a starting sol prior to the rapid evaporation step. It is only necessary in the use of any type of organo silica sol that the sol and the silica particles themselves be substantially free of electrolyte, that is to say, have a sodium content expressed as $Na_2SO_4$ of 0.01% or less.

METHOD OF PRODUCING THE AMORPHOUS POWDER

As has been generally described above, the amorphous silica particles may be formed from the salt-free aqueous or organo silica sols by any appropriate rapid evaporation method. It is essential that this method of evaporation be performed in a sufficiently rapid manner in order to prevent any substantially number of siloxane bonds forming and thus cross-linking the discrete silica particles during the process. If cross-linking occurs, the resultant silica particles are agglomerated to such an extent that they are unable to be redispersed in the below-described aqueous amine solutions. Such rapid evaporation methods as conventional flash evaporation, vacuum drum-drying, and spray drying are appropriate. Of these, the most preferred method is spray drying the liquid silica sols at temperatures ranging from 200 to 800° F. Preferably, the average temperature of drying is from 300 to 800° F. This spray drying technique is particularly adaptable to the method of the invention, since the water or organic liquid phase is quickly removed without a prolonged drying time which promotes gellation, with resultant undesirable amorphous products. It is again necessary that the starting silica sol be free from electrolyte, since ions in an electrolyte. particularly hydroxyl ions, catalyze the silanol condensation to produce undesirably bound silica particles.

The particular desired embodiment of the invention involving a spray-drying technique of the salt-free silica sol is shown below.

Example II

A 35% concentrated salt-free silica sol produced by the general method outlined in Example I was rapidly evaporated in this example through the use of a vertical downward spray dryer with straight-line air flow. The sol contained silica particles dispersed in an aqueous continuous phase, which particles had a specific surface area of 140 m.²/g. The sol itself had a specific gravity of 1.25. The drying gases of the spray dryer flow cocurrent with the spray. The fan is located downwind from the drying tower and a cyclone collector which accumulates the dried product.

A function of this particular spray dryer was to create a highly dispersed liquid phase at relatively high temperatures. As in normal spray drying operations, small liquid droplets were created by atomization. A fine nozzle with an orifice of 0.0465" in diameter was used to create these fine particles. A cup type core with four grooves each of which having a width of 0.020" and a depth of 0.031" was used in conjunction with the orifice. The particular fan employed had a hot gas capacity of 3400 cu. ft./min. The inlet temperature to the dryer was 920° F. and the outlet temperature was 350° F. A manton-Gaulin Laboratory Homogenizing Pump was employed with a pump pressure of 1700 pounds per square inch and a capacity of 25 gals./hr. The line pressure during the run was 425 pounds per square inch and the angle at which the sol was sprayed was 79°. The actual drying time at this relatively high temperature was less than 1 second from the initial heating to the drying of the particulate particles before cooling down to room temperature. Through the use of this particular spray drying equipment, representative silica particles of the type above described were prepared. These particles had at least one linear dimension of from 0.5 to 50 microns, with the majority of the particles being from 5.0 to 20 microns in at least one linear dimension measurement.

While the above described equipment is typical of the type that may be employed, it is to be understood that other spray drying equipment in which the drying gases flow cocurrent with or countercurrent to the spray may be used. Also, the spray may be directed vertically up or down or horizontal without departing from the envisioned scope of the invention. Such spray dryers as vertical upward cocurrent spray dryers, spray dryers with rotary air sweeper to cool and remove product which leaves with the exit gases, combined cocurrent-countercurrent spray dryer with cyclonic air flow causing product separation in dryer, etc., may be also advantageously used in the invention. The drying fans in the spray-drying systems may be located in front of or after the spray nozzles.

The preferred products are produced in a fine atomization system which has a nozzle orifice ranging from 0.03" to 0.1" in diameter and most preferably from 0.04" to 0.07" in diameter. Of course, the size of the particle is not only dependent upon the nozzle orifice but also directly dependent upon the capacity of the spray-drying equipment, the pressure of the system and the particular core used in conjunction with the nozzle. By suitable adjustment of any or all of the above variables, the skilled technician can easily produce the particles of the invention with their requisite dimensional characterstics. For example, if one maintains the capacity, nozzle size and core type constant, the particles can be made finer with an increase in pressure. In like manner, if one keeps the capacity of the system and its pressure constant, the size of the silica particles may be adjusted according to the nozzle orifice diameter and the particular core used to impart the requisite spin to the feed material. The core may be changed with regard to the dimensions of the slots, the number of the slots, and the angle at which the slots are placed.

*Example III*

An alcohol sol composed of 35% silica uniformly dispersed in ethyl-"Cellosolve" (2-ethoxy ethanol) solvent was prepared according to the method outlined in co-pending application, Serial No. 821,474, filed January 9, 1961, now U.S. Patent No. 2,966,065. This particular alcohol sol was essentially salt-free with a sodium content expressed as $Na_2SO_4$, of less than 0.01%. 350 ml. of the alcohol sol were put in a 3-necked, 500 ml. flask. Vacuum was maintained at 15 mm. and substantially all the alcohol was removed at 43° C. under this reduced pressure. When all of the alcohol had been removed the resulting dry powder was easily dispersed in an amine solution. The same type of powder was produced by removing the alcohol at ambient pressure at 135° C.

*Example IV*

This example points out another embodiment of the invention whereby the salt-free silica sols may be rapidly evaporated in the presence of a volatile amine to obtain the amorphous silica powder. An added advantage of using the volatile amine is achieved by substantially decreasing the amount of corrosion of the spray-drying unit that may take place through the use of the acidic salt-free silica sols alone. To a 35% aquasol of the type described in Example II, was added 10% methylamine based on the weight of the silica particles. The methylamine was thoroughly admixed with the aqueous silica sol and then subjected to the same type of spray-drying treatment as outlined in Example II. An amorphous silica powder of the same character as described in the preceding examples was obtained. Analysis showed only slight trace amounts of amine content, indicating that the volatile amine had been driven off along with the water during the automization of the sol. The pH of the sol before spray drying was about 9. This is a somewhat more desirable environment in which to spray when compared to the more acidic salt-free silica sols which are sprayed without resort to volatile amine. As will be seen below, the particular powder obtained was nevertheless redispersible in aqueous lower alkyl amine solutions. This demonstrates that the volatile amine did not promote, to any appreciable extent, the cross-linking reaction between the discrete ultimate silica particles.

While in the above example, methylamine was used, it must be understood that any volatile amine or organic nitrogen base which may be easily driven off by rapid evaporation, such as in a spray-drying step, may be likewise employed. However, the more preferred volatile amines are those which possess boiling points lower than 250° C. The amount of amine employed as an anti-corrosion agent may range from 0.5–100 parts per 100 parts of silica. More preferably, the amine content may vary from 1–30 parts per 100 parts of solid silica.

THE DISPERSION OF THE AMORPHOUS SILICA POWDERS

As has been briefly mentioned above, the novel silica powders of the invention posses the unusual and desirable property of being redispersed in certain aqueous lower alkyl amine solutions, and when so redispersed, constitute true sols. The salt-free silica particles obtained from the rapid evaporation process outlined above, therefore, can be used directly for the intended application, or else can be applied as homogeneous, stable sols, the choice of use depending, of course, upon the particular system to which the silica is applied.

Ten grams of the dry amorphous salt-free silica powder obtained from the spray-drying process outlined in Example II were slurried in 90 grams of water. If this slurry was not further treated, the silica rapidly precipitated from the aqueous phase. No true stable sols were formed by resort to water alone. Moreover, addition of alcohols and/or aromatic solvents to the aqueous slurry or to the amorphous silica powder alone, did not result in sol formation. However, when certain alkyl amines in amounts listed in Table II below were added to the aqueous slurry, immediate sol formation was effected, which sol remained stable over long periods of time. Table II, as follows, shows results with some particularly preferred lower alkyl amines from among those whose addition to the aqueous slurry is necessary to effect sol formation.

TABLE II

| Amine | cc. | Sol Character After 24 Hrs. | Sol Character After 4 Days |
|---|---|---|---|
| Diethyl | 10.0 | Slightly Opaque Sol | Clear, Trace Sediment. |
| Do | 5.0 | do | Do. |
| Do | 2.5 | do | Clear, Small Amount Precipitate. |
| Do | 20.0 | do | Clear, Trace Sediment. |
| Do | 1.0 | do | Clear, Small Amount Precipitate. |
| Do | 0.7 | Opaque Upper Liquid Layer, Considerable Silica Precipitation. | Opaque, Heavy Precipitate. |
| Do | 0.5 | Complete Silica Precipitation | |
| t-Butyl | 5.0 | Opaque Sol | Clear, Small Amount Precipitate. |
| Do | 1.0 | Opaque Sol, Minor Amount Silica Precipitation. | Do. |
| n-Hexyl | 5.0 | Considerable Sediment | Gelled. |
| Do | 1.0 | Complete Silica Precipitation | |
| 40% Aqueous Methyl | 12.5 | Opaque Sol | Clear, Trace Sediment. |
| Do | 2.5 | Opaque Sol, Slight Silica Precipitation. | Do. |
| n-Octyl | 5.0 | Gelled | |
| Tetraethyl Ammonium Hydroxide. | 10.0 | Opaque Sol | Clear, Trace Sediment. |
| Dimethyl, dihydrogenated tallow quaternary ammonium chloride. | 10.0 | No Sol Formation | |

The above table shows that only those amines which have less than six carbon atoms are able to assist in the sol formation. Higher alkyl amines, such as octyl amine or fatty quaternary ammonium chlorides, cannot be used to redisperse the salt-free silica powder.

Table III below shows that highly concentrated silica sols may also be made of the amorphous silica powders of the invention. Concentrated sols containing the amorphous silica particles up to 50% in silica content have been made. However, when these concentrated sols are desired, the preferred method of making same is to add increasing amounts of amine. Particularly, increased amine content aids in reducing the viscosity and increasing the clarity of the sol.

TABLE III

| 40% Methyl Amine, cc. | Silica Powder, gms. | H²O, gms. | Immediate Sol Character | Sol Character 4 days |
|---|---|---|---|---|
| 5 | 20 | 25 | Viscous, Opaque | Viscous, Opaque. |
| 10 | 20 | 25 | ____do____ | Clear, Trace Sediment. |
| 25 | 25 | 25 | Opaque, Slight Precipitate | Opaque, Slight Precipitate. |

The amorphous salt-free silica particles of the invention, as shown above, may be easily dispersed in lower alkyl amine water solutions. Both elements of the liquid phase, that is, the lower alkyl amine and water are necessary. It is beilved that the inclusion of the amine is essential to help peptize the silica while the function of the water is to hydrate the surface of the silica particles, the coaction of both liquids resulting in forming the sols. While suitable lower alkyl amine aqueous sols may be made by adding 1–100 weight parts of amine per 100 weight parts of silica, it is preferred that from 10 to 50 weight parts of amine are added per 100 weight parts of silica. The water to amine weight ratio is preferably in the range from 1 to 9 to 9 to 1. Most preferably, however, the amine-water weight ratio is 3 to 7 to 7 to 3.

As generally mentioned above silica sols containing even minor amounts of electrolyte could not, after drying, be redispersed. It was surprising to note that a silica sol which had a silica to sodium ratio of about 100:1 and a pH of 8.6 when spray-dried from the alkaline sol, was unable to be redispersed in the lower alkyl amine-water solution, regardless of the amounts of either of the two liquids added. This is probably due to catalysis by the electrolyte of the cross-linking reaction of the discrete silica particles existing in the starting sol, so that large agglomerates are formed with extensive siloxane bonding. Since these alkali stabilized sols cannot be redispersed, they would, of course, have limited application and are therefore considered undesirable.

The products of this invention can be used for a wide variety of purposes, either in the form of the dry amorphous salt-free silica particle, or as the lower alkyl amine-aqueous sol thereof. For example, they can be used to treat textiles and textile fibers for improving slip-resistance and snag-resistance. They may also be used as fillers or modifiers in plastics, elastomers, paints and other coating compositions, etc. Further, they may be adapted for use in adhesives, greases, or as a carrier for pesticides, fungicides, etc. A particularly desirable property in their ability to be used as delusterizing agents and as carriers for petroleum processing catalysts. These products may also be utilized in the surface modification of rubber, elastomers, and the like.

What we claim is:

1. The method of producing an amorphous salt-free, non-spheroidal silica powder having at least one linear dimension of 0.5–50 microns and composed of weakly bonded, discrete salt-free silica particles having a surface area of at least 120 m.$^2$/g., said powder capable of forming a sol upon slurrying in aqueous solutions of lower alkyl amines containing less than 6 carbon atoms, which comprises the steps of providing a salt-free silica sol containing dense, discrete silica particles having a surface area of at least 120 m.$^2$/g. as a dispersed phase, uniformly dispersed in a liquid phase, and subjecting said sol to flash evaporation whereby the liquid phase is rapidly evaporated from the dispersed phase and said amorphous silica powder is formed.

2. The method of claim 1 wherein the salt-free silica sol contains 0.1–60% silica, and said liquid phase in water.

3. The method of producing an amorphous salt-free, non-spheroidal silica powder having at least one linear dimension of 0.5–50.0 microns and composed of weakly bonded, discrete salt-free silica particles having a surface area of at least 120 m.$^2$/g., said powder capable of forming a sol upon slurrying in aqueous solutions of lower alkyl amines containing less than 6 carbon atoms, which comprises the steps of providing a salt-free silica sol containing dense, discrete silica particles having a surface area of at least 120 m.$^2$/g. as a dispersed phase, uniformly dispersed in a liquid phase, and subjecting said sol to spray-drying whereby the liquid phase is rapidly evaporated from the dispersed phase and said amorphous silica powder is formed.

4. The method of claim 3 wherein the salt-free silica sol contains 0.1–60% silica, the liquid phase is water, and said spray-drying is effected at temperatures in excess of 300° F.

References Cited by the Examiner

UNITED STATES PATENTS

| | | | |
|---|---|---|---|
| 1,506,118 | 8/1924 | Govers | 23—182 |
| 1,843,576 | 2/1932 | McClure et al. | 23—182 |
| 1,903,187 | 3/1933 | McClenahan | 23—182 |
| 2,601,235 | 6/1952 | Alexander et al. | 23—182 |
| 2,601,352 | 6/1952 | Wolter. | |
| 2,614,993 | 10/1952 | Montenyohl et al. | |
| 2,750,345 | 6/1956 | Alexander. | |
| 2,765,242 | 10/1956 | Alexander et al. | 23—182 XR |
| 3,041,140 | 6/1962 | Alexander | 23—182 |

FOREIGN PATENTS 788,152  12/1957  Great Britain.

LEON D. ROSDOL, *Primary Examiner.*

MAURICE A. BRINDISI, JULIUS GREENWALD,
*Examiners.*

H. T. CARTER, R. D. LOVERING, *Assistant Examiners.*